United States Patent
Chippada et al.

(10) Patent No.: US 12,482,028 B2
(45) Date of Patent: Nov. 25, 2025

(54) BUILDING SHOPPABLE VIDEO CORPUS OUT OF A GENERIC VIDEO CORPUS VIA VIDEO META DATA LINK

(71) Applicant: Microsoft Technology Licensing, LLC, Redmond, WA (US)

(72) Inventors: Arun Kumar Chippada, Bellevue, WA (US); Yucan Zhang, Bothell, WA (US); Marcelo M. De Barros, Redmond, WA (US); Xulong Zhang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 231 days.

(21) Appl. No.: 18/211,076

(22) Filed: Jun. 16, 2023

(65) Prior Publication Data
US 2024/0420204 A1    Dec. 19, 2024

(51) Int. Cl.
*G06Q 30/06*    (2023.01)
*G06Q 30/0601*   (2023.01)

(52) U.S. Cl.
CPC ..... *G06Q 30/0625* (2013.01); *G06Q 30/0601* (2013.01); *G06Q 30/0639* (2013.01)

(58) Field of Classification Search
CPC ........... G06Q 30/0601; G06Q 30/0625; G06Q 30/0639
USPC .............................................. 705/26.1, 26.62
See application file for complete search history.

(56) References Cited

U.S. PATENT DOCUMENTS

| | | | |
|---|---|---|---|
| 8,577,734 B2 * | 11/2013 | Treyz | H04W 4/24 705/26.1 |
| 9,471,936 B2 | 10/2016 | Fleischman | |
| 9,973,819 B1 | 5/2018 | Taylor et al. | |
| 2013/0085894 A1 * | 4/2013 | Chan | G06Q 30/02 705/26.62 |
| 2013/0275306 A1 * | 10/2013 | Ignatchenko | G06Q 20/38215 705/44 |
| 2016/0269473 A1 * | 9/2016 | Bhogal | H04L 67/535 |
| 2021/0326967 A1 | 10/2021 | Geekee et al. | |
| 2022/0060534 A1 | 2/2022 | Bodin et al. | |

(Continued)

FOREIGN PATENT DOCUMENTS

| | | | | |
|---|---|---|---|---|
| CN | 111279336 A | | 6/2020 | |
| EP | 3161610 B1 * | | 8/2020 | ......... G06F 16/9566 |

OTHER PUBLICATIONS

Przybyła, Piotr et al.; "Text mining resources for the life sciences"; PubMed Central Publication PMC PubMed Central Id: 5199186; Published in: Database: The Journal of Biological Databases and Curation, 2016, baw145 retrieved from Ip.com database on Mar. 31, 2025 (Year: 2016).*

(Continued)

*Primary Examiner* — Yogesh C Garg
(74) *Attorney, Agent, or Firm* — Shook, Hardy & Bacon L.L.P.

(57) ABSTRACT

Aspects of the present disclosure relate to providing a shoppable video corpus by generating a shoppable URL. A URL is extracted from a video corpus, in which the extracted URL may be a long URL or a short URL. Extracted URLs are then combined and normalized. From the normalized URL, noise is removed and quality control is performed. As a result, shoppable URL may be presented at the user's computing device as personal recommendation. The video and metadata of the cleaned URL is also ingested and stored in a database for future reference.

20 Claims, 8 Drawing Sheets

(56) References Cited

U.S. PATENT DOCUMENTS

2022/0122161 A1 4/2022 Perera
2022/0284218 A1 9/2022 Yang et al.

OTHER PUBLICATIONS

Ozyurt IB, Grethe JS, Martone ME, Bandrowski AE. Resource Disambiguator for the Web: Extracting Biomedical Resources and Their Citations from the Scientific Literature. CRBS, UCSD, La Jolla, CA, United States of America, published Jan. 5, 2016;11 retrieved from IP. Com on Jul. 19, 2025 (Year: 2016).*
Bansal, Shivam, "6 Practices to enhance the performance of a Text Classification Model", Retrieved from: https://www.analyticsvidhya.com/blog/2015/10/6-practices-enhance-performance-text-classification-model/, Oct. 29, 2015, 9 Pages.

* cited by examiner

US 12,482,028 B2

BUILDING SHOPPABLE VIDEO CORPUS OUT OF A GENERIC VIDEO CORPUS VIA VIDEO META DATA LINK

BACKGROUND

Shoppable videos, where users can shop and discover products while watching videos, may be the future of shopping. This approach is already popular in some countries and gaining popularity in others including the United States. Videos is already one of the primary ways in which users discover new products and this is evident in usage patterns seen on platforms such as YouTube™, TikTok™, etc. Shoppable videos extend this idea further through an experience of showing products on a same screen as the video. This enables users to see the product information and shop for the product while continue watching the video.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to providing and generating shoppable videos. Majority of videos that are created are generic or non-shoppable videos. That is, these generic videos are not created with shoppable experience implementation. As compared to non-shoppable videos, shoppable videos provide convenience and efficient shopping experience to users. With shoppable videos, users can discover products introduced in videos and may shop for such products while continuing to watch videos. As a result, a scalable approach to convert the generic videos, that are relevant to users in shopping context, by using links (e.g., Uniform Resource Locators or URLs) that are available in the video meta data is provided.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
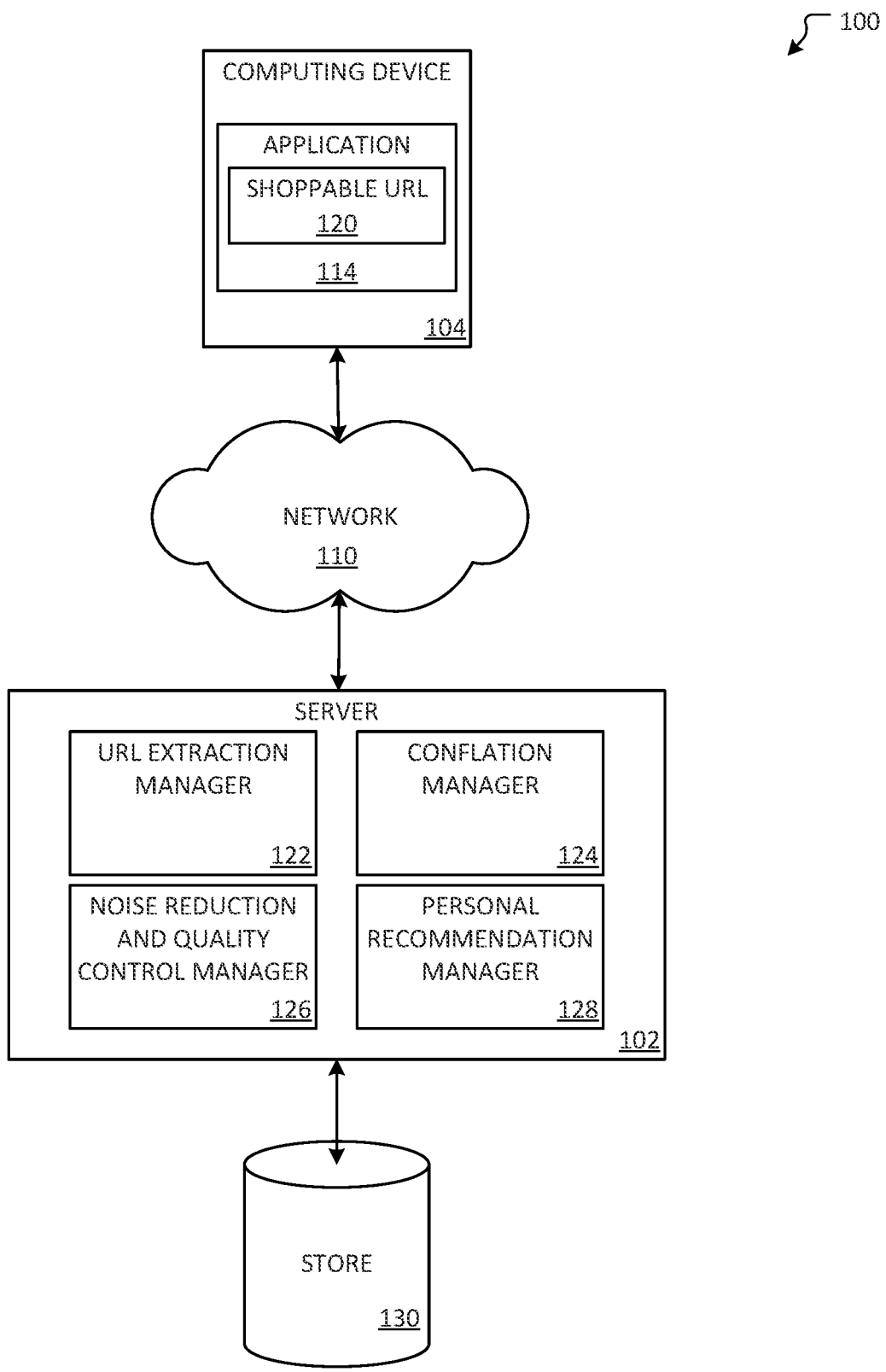
FIG. 1 illustrates an overview of an example system in which a shoppable URL be received according to aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods or systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, it may be provided a recommendation feed for products of interest (e.g., products that a user is interested in). However, the recommendation feed is generally provided as an independent context (e.g., an independent page on a website platform), similar to those for example, a TV shopping experience utilizing a third-party provider. In the third-party provider content, video corpuses are created as product demonstrations (e.g., a host describing about and/or demonstrating the products). The problem with such product demonstrations is that video corpuses are created in non-scalable ways. Also, only a limited number of video corpuses can be created. As a result, the user may become frustrated or may fail to become aware of the products that the user may be interested in.

Accordingly, aspects of the present disclosure relate to generating shoppable uniform resource locators (e.g., URL) for video corpuses. In examples, generated links (e.g., URLs) are provided in the disclosed shoppable video corpuses, which may be used to provide shopping experiences. In some instances, URLs are extracted from a generic video corpus. In other instances, short URLs are extracted from a generic video corpus. When short URLs are extracted, a crawler is used to craw short URLs to expand into longer (e.g., normal or full) URLs (e.g., URL conflation). The extracted URLs (e.g., both normal and short) are then combined together to generate combined URLs. The combined URLs are then conflated and normalized.

As a further example, during the URL conflation, the URLs are parsed to retrieve product information (e.g., catalog identification). The retrieved product information is then used to search a product catalog to specify the product. In another example, in the process of URL conflation, the combined URLs are normalized using a technique of strong normalization and normalized URS are generated.

In examples, a noise reduction and quality control are performed on the normalized URLs. For example, a product category filter is applied to the normalized URLs. This would identify, for example, the categories in which the products would fall under. As another example, a video duplication filter is applied to the normalized URLs. This would eliminate, for example, duplicate normalized URLs for the same product. As another example, minimum view count and product count are performed on the normalized URLs as means for quality control.

In examples, after noise reduction and quality control have been performed, the cleaned URLs are used to generate personal product recommendations. In examples, personal product recommendations are presented in forms of product URLs. In another example, video corpuses and meta data of the normalized URLs are ingested (e.g., obtaining and importing data for immediate use or storage in a database) and save in a live shopping operating system. The user can use the produce URLs to shop for the products.

In a further example, videos corpuses that may be used to generate shoppable URLs are detected based on, for example, posting time, topic, and trend. Shoppable videos may be ranked based on user interest and trending. Search history may be used to discover shoppable video corpuses that match user interest. In another example, to discover shoppable video corpus, video description is parsed further using, for example, keywords to identify shoppable video corpus that may not have product URL. In another example, dividing video corpus into frames, then use image processing technique such as neural network processing to extract products.

FIG. 1 illustrates one aspect of the architecture of a system for shoppable URL received at a computing device, such as a personal computer 104, according to aspects described herein. As illustrated, system 100 includes server 102, computing device 104, application 114, shoppable URL 120, and network 110. Server 102 includes URL extraction manager 122, conflation manager 124, noise reduction and quality control manager 126, and personal recommendation manager 128. Server 102 is illustrated as communicating with store 130. Server 102 and computing device 104 are illustrated as communicating via network 110, which may comprise a local area network, a wireless network, or the Internet, or any combination thereof, among other examples.

Computing device 104 may be any of a variety of devices, including, but not limited to, a mobile computing device, a tablet computing device, a laptop computing device, a desktop computing device, a server computing device, or an IoT computing device. As illustrated, computing device 104 includes shoppable URL 120. Application 114 may be any of a variety of software that executes on computing device 104, including first-party software (e.g., as may be part of or provided with an operating system of computing device 104) and third-party software, among other examples.

As an example, application 114 may be a web browser application. Application 114 may include one or more plugins, add-ons, or extensions that further extend the capabilities of application 114 (e.g., as may be provided by the developer of application 114 and/or by one or more third-parties). Application 114 may include one or more shoppable URL 120. While examples are described with respect to application 114, it will be appreciated that similar notification techniques may be applied by an operating system or other piece of software executing on computing device 104 in other examples.

As an example, server 102 may include URL extraction manager 122, conflation manager 124, noise reduction and quality control manager 126, and personal recommendation manager 128. URL extraction manager 112 extracts one or more URLs from video corpus. Conflation manager 124 conflates (e.g., normalize) the extracted one or more URLs. Noise reduction and quality control manager 126 reduces noise from the extracted one or more URLs and maintains quality of the cleaned one or more URLs. Personal recommendation manager 128 may determine the one or more shoppable URL 120 to be included in the application 114. Store 130 may communicate with personal recommendation 112 and determine contents of personal recommendation 112. The examples of process of generating shoppable URL 120 are discussed in greater detail below with respect to FIGS. 2-6.

Figure 2:
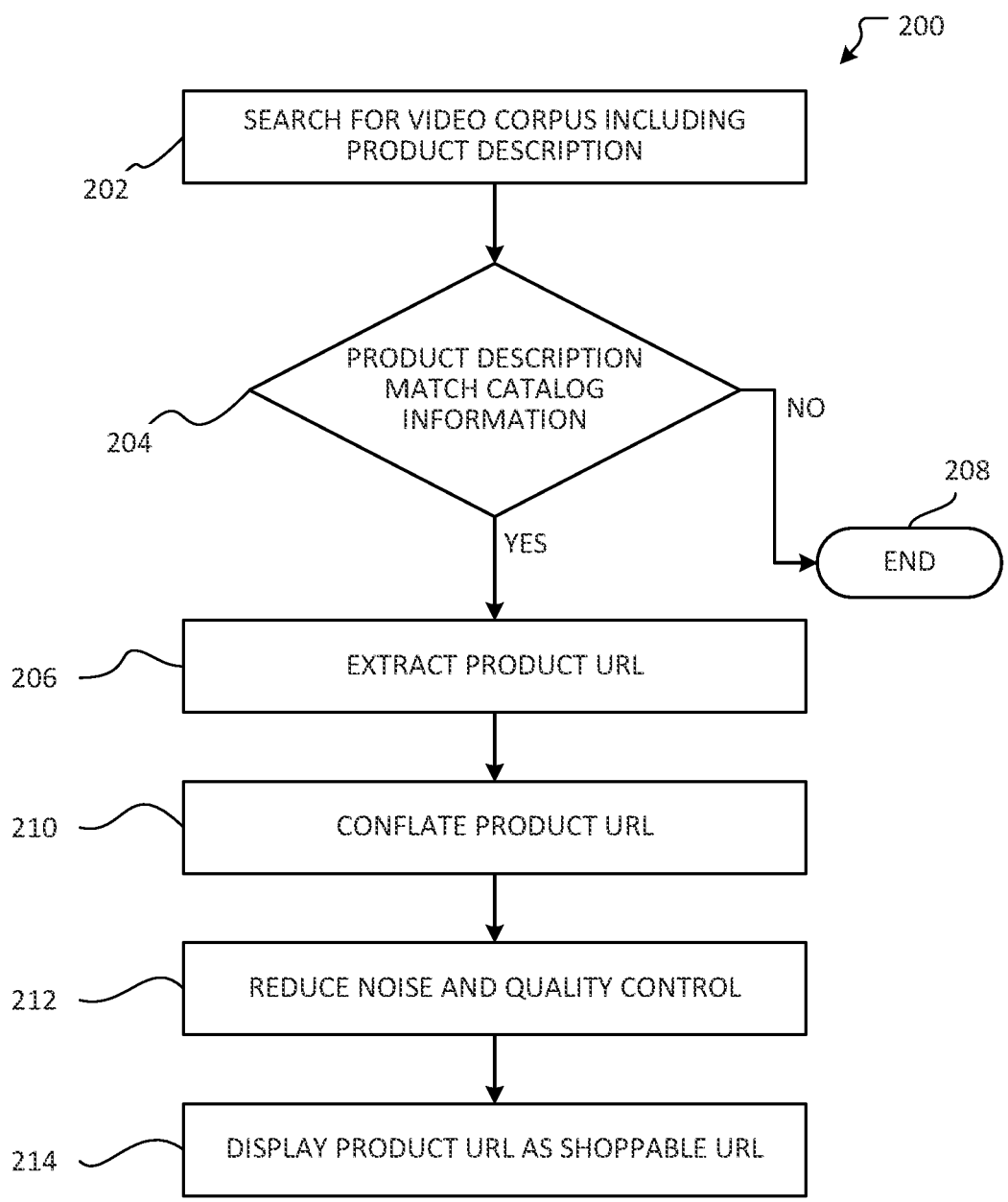
FIG. 2 illustrates an overview of an example process flow between a video corpus and a shoppable URL according to aspects described herein.

FIG. 2 illustrates an overview of an example process flow 200 of displaying one or more shoppable URLs according to aspects described herein.

Flow 200 begins at operation 202, where a video corpus including one or more product description (e.g., product URL) is identified. For example, when product description about a shirt is included in the video corpus, then this video corpus is identified. In another example, video corpus is selected based on posting time, user interest, and trend. In examples, one or more product description may exist in video corpus description. In such a case, video corpus description is parsed to identify one or more product information. In examples, machine learning may be used to identify one or more product information. In aspects, a machine learning model may be trained to identify products in a video, video frame, image, thumbnail, etc., to identify products in the content and generate or retrieve product information for the identified products. For example, a machine learning model may be trained using a training set of data from a product database, for example, which includes images of products. The trained model may then receive, as input, the content (e.g., video, video frames, images, etc.) an identify products, based upon an analysis of the content, to identify products in the content. Upon identifying a product, the machine learning model may generate product information and/or metadata, which includes an identifier to the product in the content and the product information for the identified product. In another example, image parsing may be used to identify one or more product information. At operation 204, it is determined whether product description match item description in a catalog. If product description match catalog description, then operation 204 proceeds to operation 206. If product description does not match catalog description, operation 204 terminates at operation 208.

In examples, if product description match catalog description, the flow proceeds to operation 206. At operation 206, for example, product URL that matches catalog description is extracted from the video corpus. In examples, product URL to be extracted may be normal (e.g., long or full) URL or short URL. In examples, there may be one or more normal URLs and/or short URLs to be extracted from one video corpus. In examples, extracted normal URL may be further processed without digital alteration being performed. Extracted short URL may be expanded using a crawler. Expanded short URL may be parsed to retrieve catalog identification (e.g., catalog ID) or product name. In another example, retrieved catalog ID or product name may then be used to search a catalog for a specific product.

Extracted normal URL and/or short URL may be combined to generate combined URL. In examples, one or more normal URL and one or more short URL may be combined to generate one or more combined URL.

At operation 210, generated one or more combined URL is conflated. That is, generated one or more combined URL is normalized using, for example, a method of strong normalization. Strong normalization is used, for example, to remove parameters that are unnecessary (e.g., those considered as "noise"). Strong normalization in this case is also known as, for example, user patterning product-related normalization. In examples, normalized URL is used to identify, for example, product IDs.

At operation 212, noise (e.g., parameters that are unnecessary or redundant) is removed from normalized URL and quality of the normalized URL is checked. For example, product category filter is applied to normalized URL to identify categories in which normalized URL belongs. In another example, video duplication filter is applied. Video duplication filter is applied to remove, for example, duplicate normalized URL so that multiple normalized URLs for a same product are not provided to user. In another example, minimum view count and product count are performed to provide relevant information to the user.

In example, after normalized URL is cleaned, the flow proceeds to operation 212. At operation 212, cleaned URL is presented as shoppable URL (e.g., searchable and selectable URLs) to the user. In examples, one or more shoppable URL may be presented. In another example, shoppable URL may be presented in a form of visual icon that includes, but not limited to, product name, product description, product location, product image, and product price.

Figure 3:
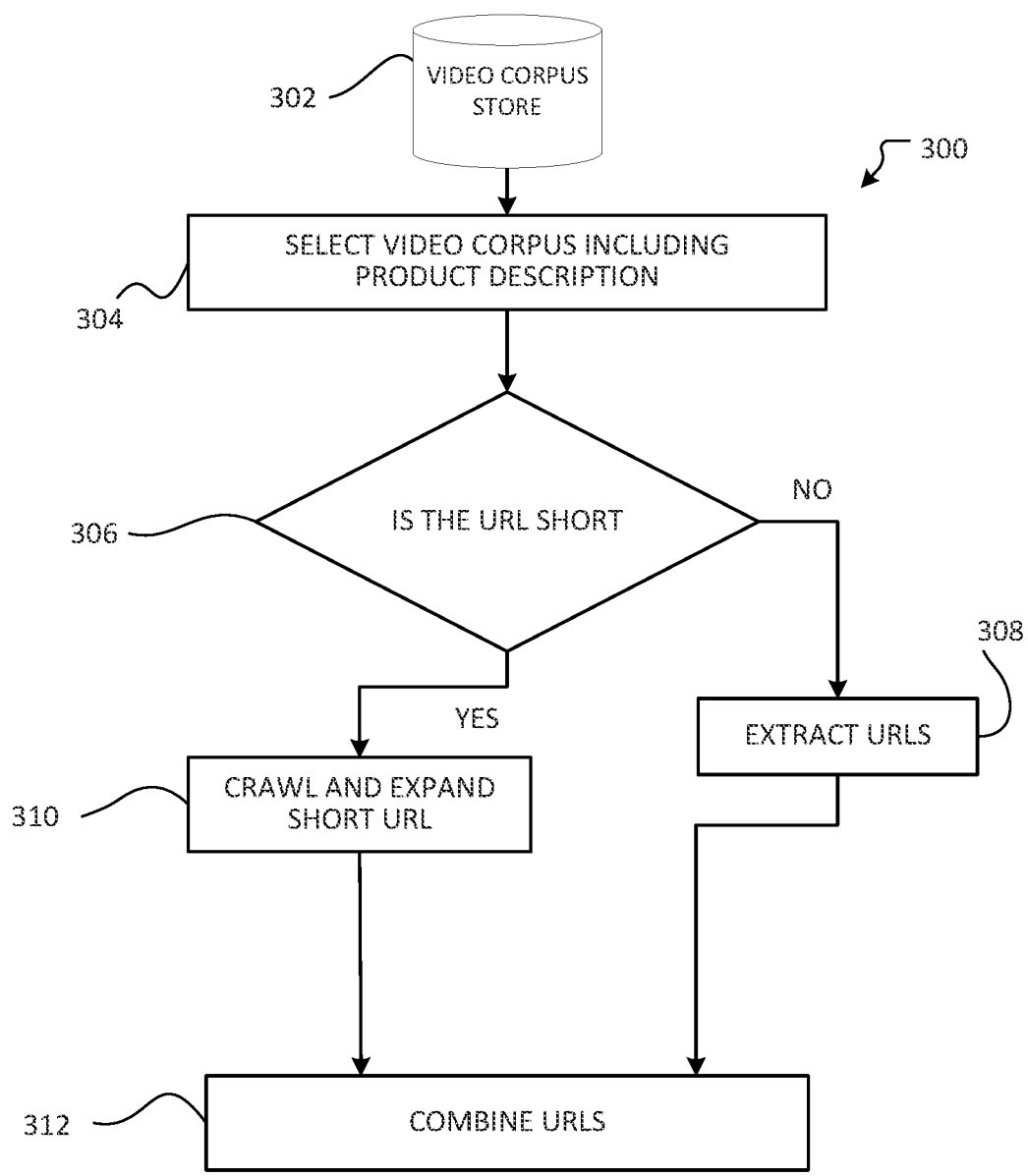
FIG. 3 illustrates an overview of an example method for generating a combined URL from a video corpus.

FIG. 3 illustrates an overview of an example method 300 for generating a combined URL in detail. In examples, aspects of method 300 are performed by URL extraction manager 122 in FIG. 1.

Method 300 begins at operation 302, where video corpus provided by a video corpus store (e.g., multi-media index). In examples, video corpus provided by the multi-media index may or may not include product description. At operation 304, video corpus that includes product description is selected. For example, if the video corpus includes product description for a pair of shoes, then this corpus will be selected. In examples, product description may be provided in a form of product URL. In another example, if no product description is included in video corpus, this video corpus will not be selected for further processing.

Accordingly, at operation 306, it is determined whether the identified product URL is a short (e.g., abbreviated) URL. If the detected product URL is long (e.g., normal URL or full URL), then operation 304 proceeds to operation 308 where product URL is extracted without performing any further digital alteration. For example, the long product URL is extracted and processed without adding elements to or deleting elements from the URL. By contrast, at operation 306, if the detected product URL is short, then flow 300 proceeds to operation 310. At operation 310, detected short URL is expanded by using, for example, a crawler. That is, short URL is expanded into normal (e.g., long or full) URL. In examples, expanded URL is parsed to extract product information, such as product ID or product name. Extracted product information is then used to find a matching product in a product catalog.

As noted, short URL expansion efficiency is increased by, for example, using same IP address for crawling or by using same affiliate URL as in the video corpus. In another example, short URL expansion efficiency is increased by keeping track of all previous crawling data and only crawl when necessary. In examples, attribution for video corpuses is cached as attribution for product does not change.

At operation 312, extracted long URL and expanded short URL are combined together to generate, for example, combined URL. In examples, combined URL is normalized and conflated.

Figure 4:
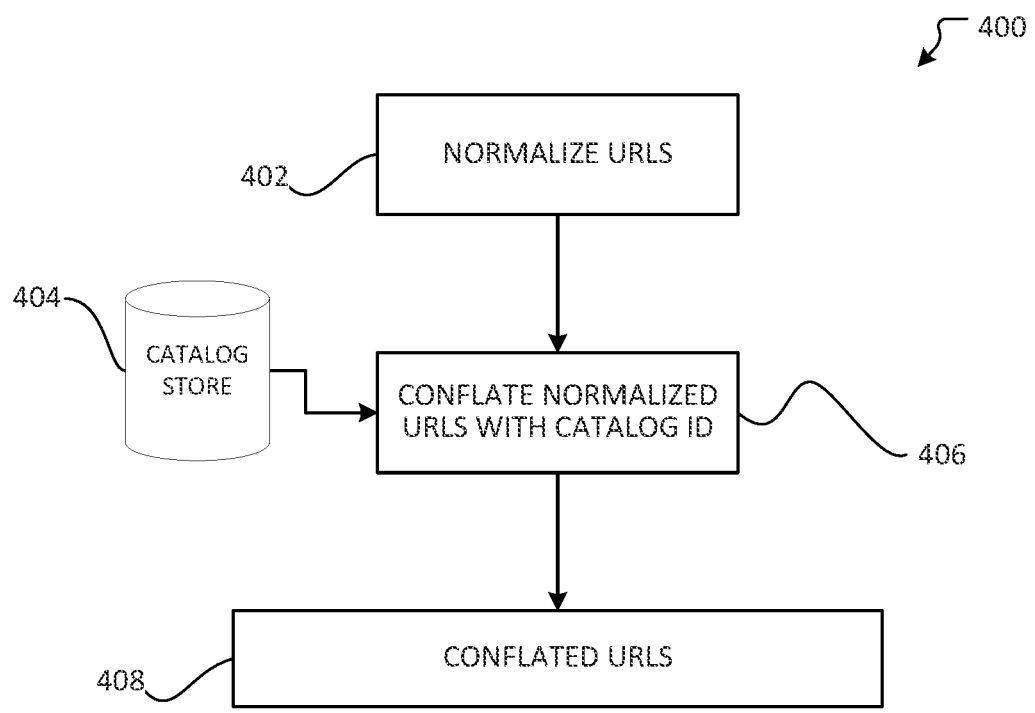
FIG. 4 illustrates an overview of an example method for conflation according to aspects described herein.

FIG. 4 illustrates an overview of an example method 400 for conflating combined URL. In examples, aspects of method 400 are performed by conflation manager 124 in FIG. 1.

Method 400 begins at operation 402, where combined URL is normalized. For example, the combined URL generated at operation 312 illustrated in FIG. 3 is normalized using strong normalization. In examples, strong normalization is performed by removing parameters that are considered as "noise" (e.g., elements that are unnecessary or redundant). In another example, strong normalization is user patterning product-related normalization. In examples, strong normalization is performed to retrieve product ID.

At operation 406, normalized URL is conflated (e.g., strongly matched) with catalog ID provided by a catalog store 404 (e.g., Microsoft Merchant Center offers). In examples, conflation process occurs by parsing normalized URL to retrieve product ID or product name. Retrieved product ID or product name is then used to search for matching product in a catalog using catalog ID. At operation 408, conflated URL is generated as a result. In examples, conflated URL includes product attribute information such as product name, product description, and product link. In examples, conflation process is performed to retrieve relevant product attribute information, as short URL in video corpus may not provide such product attribute information. In another example, timestamp may be used in retrieving product information.

Figure 5:
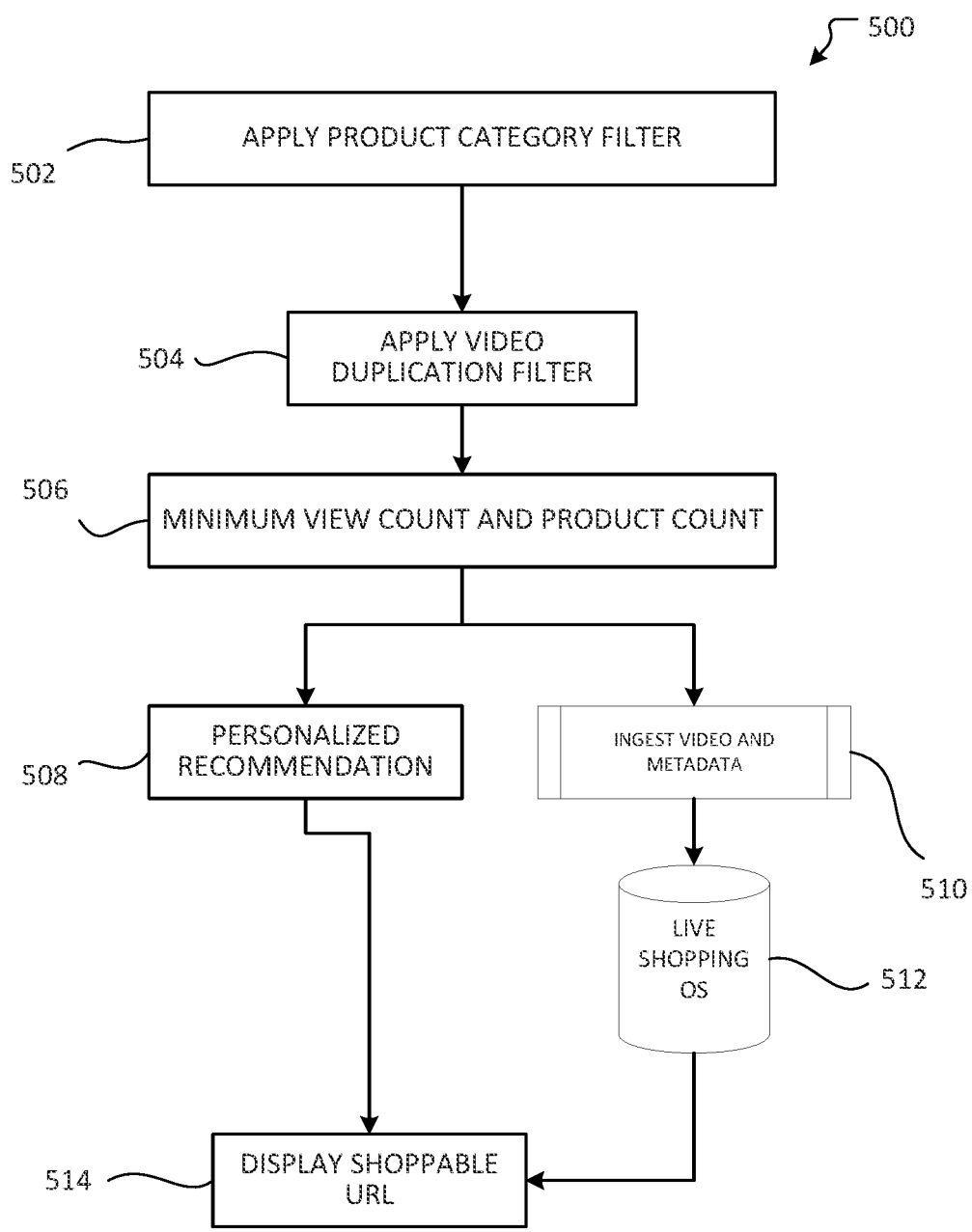
FIG. 5 illustrates an overview of an example for applying filters according to aspects described herein.

FIG. 5 illustrates an overview of an example method 500 for applying filters on conflated URLs. In examples, aspects of method 500 are performed by noise reduction and quality control manager 128 in FIG. 1.

Method 500 begins at operation 502, where product category filter is applied to conflated URL. In examples, product category filter is used to identify specific product identified in conflated URL. In examples, if product information does not match video corpus topic, then such product is removed. In examples, video corpus is categorized by information such as content description and video title. In examples, video corpus classification is done using text (e.g., product signal) classification model.

At operation 504, video duplication filter is applied. In examples, video duplication filter removes dataset's redundant data. For example, if a same short URL is repeated across multiple video corpuses, it may be an indication that this product has no correlation to these video corpuses. In such case, these duplicate short URLs are removed from processing. Removing duplicate short URLs would help to improve the quality of user experience. In examples, video duplication filter is applied when video corpus having five products or more and are repeated in same order. In examples, cross referencing between product category and duplication may be possible.

At operation 506, minimum view count and product count are taken. In examples, minimum view count and product count are taken to keep only relevant data (e.g., popular products, latest products, products with available stocks, etc.). At operation 508, based on minimum view count and product count, personalized recommendation is created. In examples, one or more personalized recommendation of products can be created. In another example, personalized recommendation is generated in a from of shoppable URL.

At operation 510, video and metadata are ingested. In examples, video and metadata are obtained and imported for immediate use or for purpose of being stored in database. In examples, obtained video and metadata are used to improve efficiency in short URL expansion. In another example, obtained video and metadata are used to improve noise reduction process. At operation 512, obtained video and metadata may be stored in live shopping operating system database for future reference.

At operation 514, one or more cleaned URL is presented as shoppable URL. In examples, shoppable URL is a link to product introduced in video corpus. In examples, user may click on presented shoppable URL and make purchase without leaving the video corpus. That is, for example, a popup window including product information may be presented. In another example, shoppable URL may include product title, product description, product location (e.g., e-commerce URL), product image, and product price.

Figure 6:
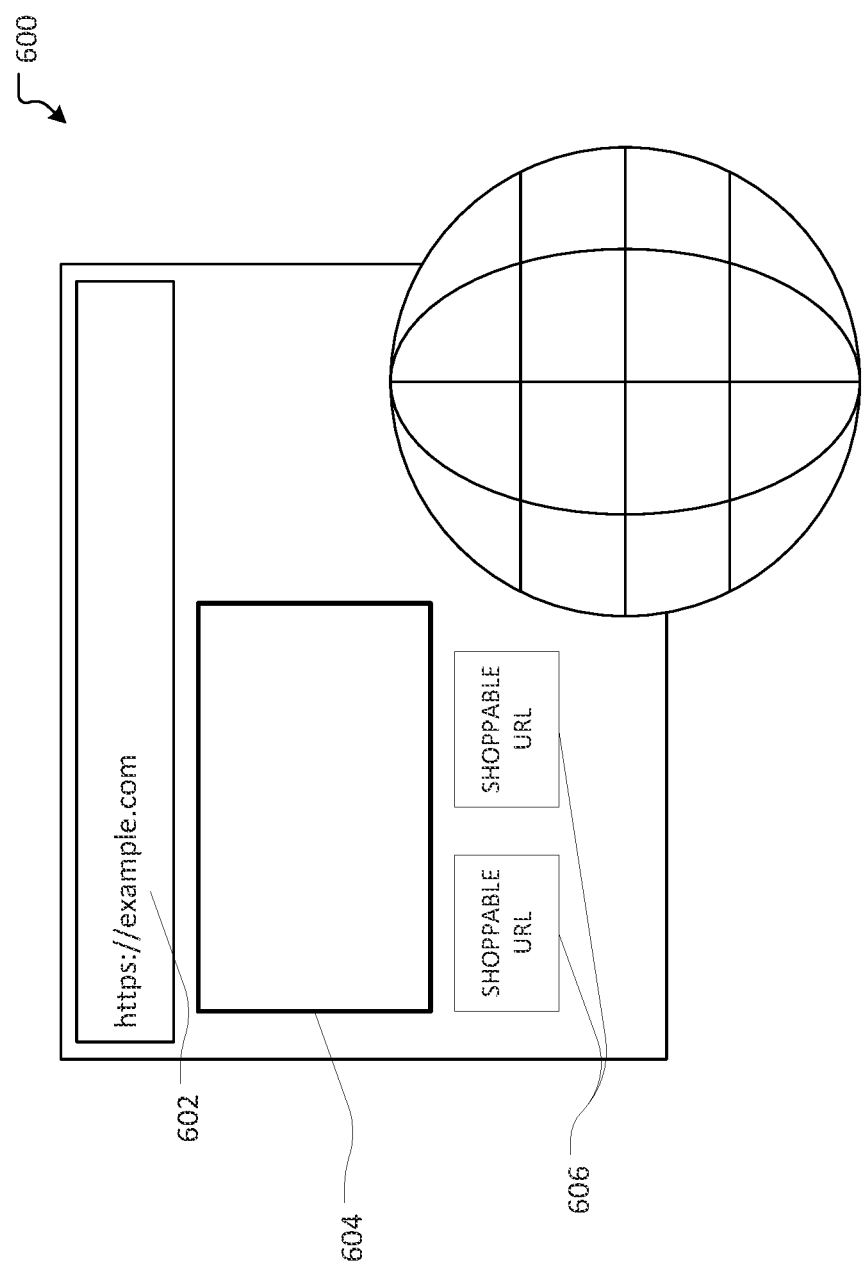
FIG. 6 illustrates an overview of an example of a user interface according to aspects described herein.

FIG. 6 illustrates an overview of an example user interface 600 for presenting URLs. In examples, aspects of method 600 are performed by server 102 in FIG. 1.

In examples, link 602 is a link to video corpus. In examples, the video corpus includes one or more product information. In examples, the link may be a long (e.g., normal) URL or a short URL.

In examples, screen 604 may be the video corpus that user is watching. In examples, shoppable URL user interface 604 is a link to a product. In examples, one or more shoppable URL user interface may be displayed. In examples, shoppable URL user interface may include product name, product information, product location (e.g., e-commerce website where the product may be found), and product image.

Figure 7:
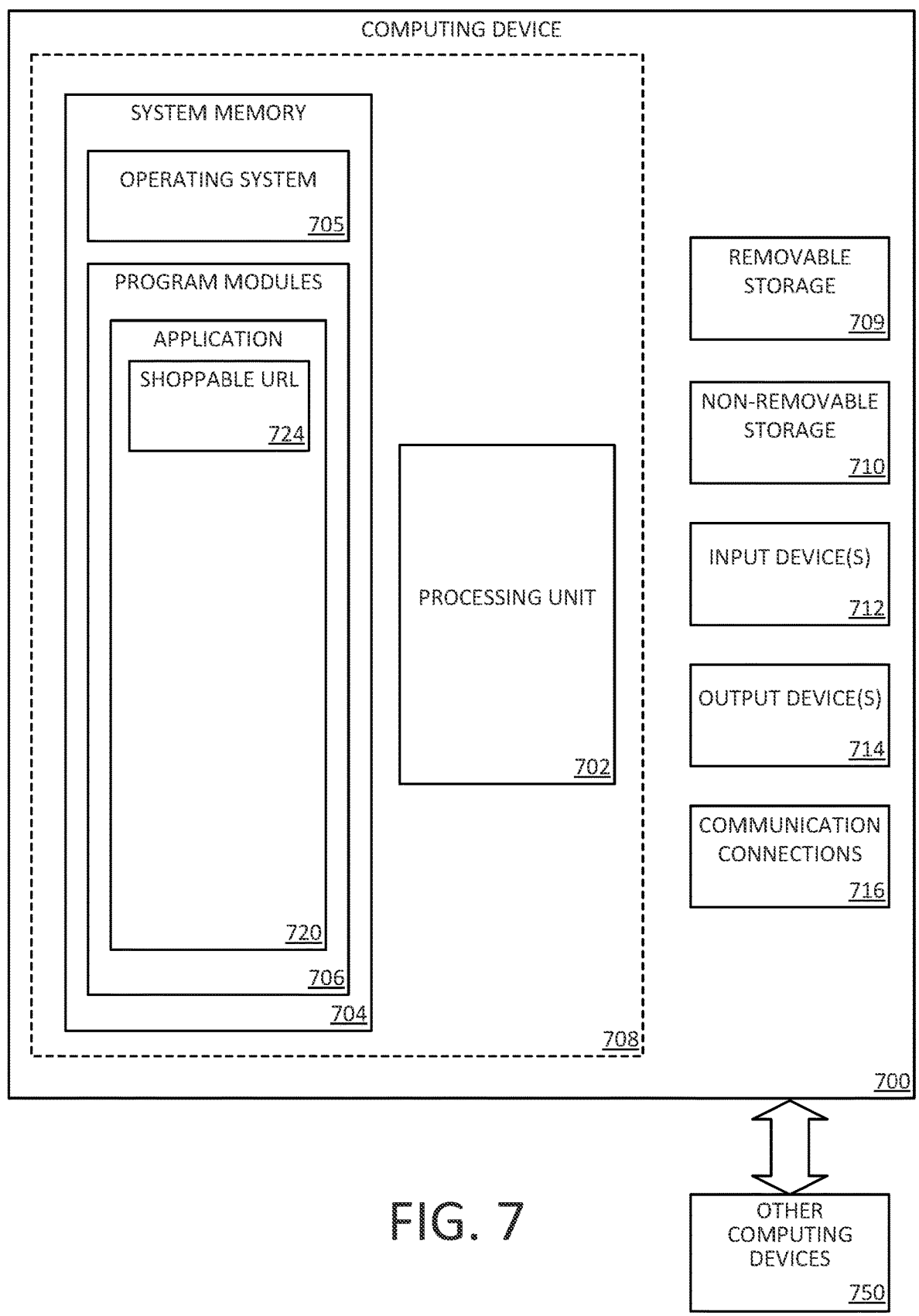
FIG. 7 is a block diagram illustrating example physical components of a computing device with which aspects of the disclosure may be practiced.

FIGS. 7, 8A, and 8B and the associated descriptions provide a discussion of a variety of operating environments in which aspects of the disclosure may be practiced. However, the devices and systems illustrated and discussed with respect to FIGS. 7, 8A, and 8B are for purposes of example and illustration and are not limiting of a vast number of computing device configurations that may be utilized for practicing aspects of the disclosure, described herein.

FIG. 7 is a block diagram illustrating physical components (e.g., hardware) of a computing device 700 with which aspects of the disclosure may be practiced. The computing device components described below may be suitable for the computing devices described above, including computing device 104 in FIG. 1. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories.

The system memory 704 may include an operating system 705 and one or more program modules 706 suitable for running software application 720, such as one or more components supported by the systems described herein. As examples, system memory 704 may store context engine 724 and notification engine 726. The operating system 705, for example, may be suitable for controlling the operation of the computing device 700.

Furthermore, embodiments of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., application 720) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8:
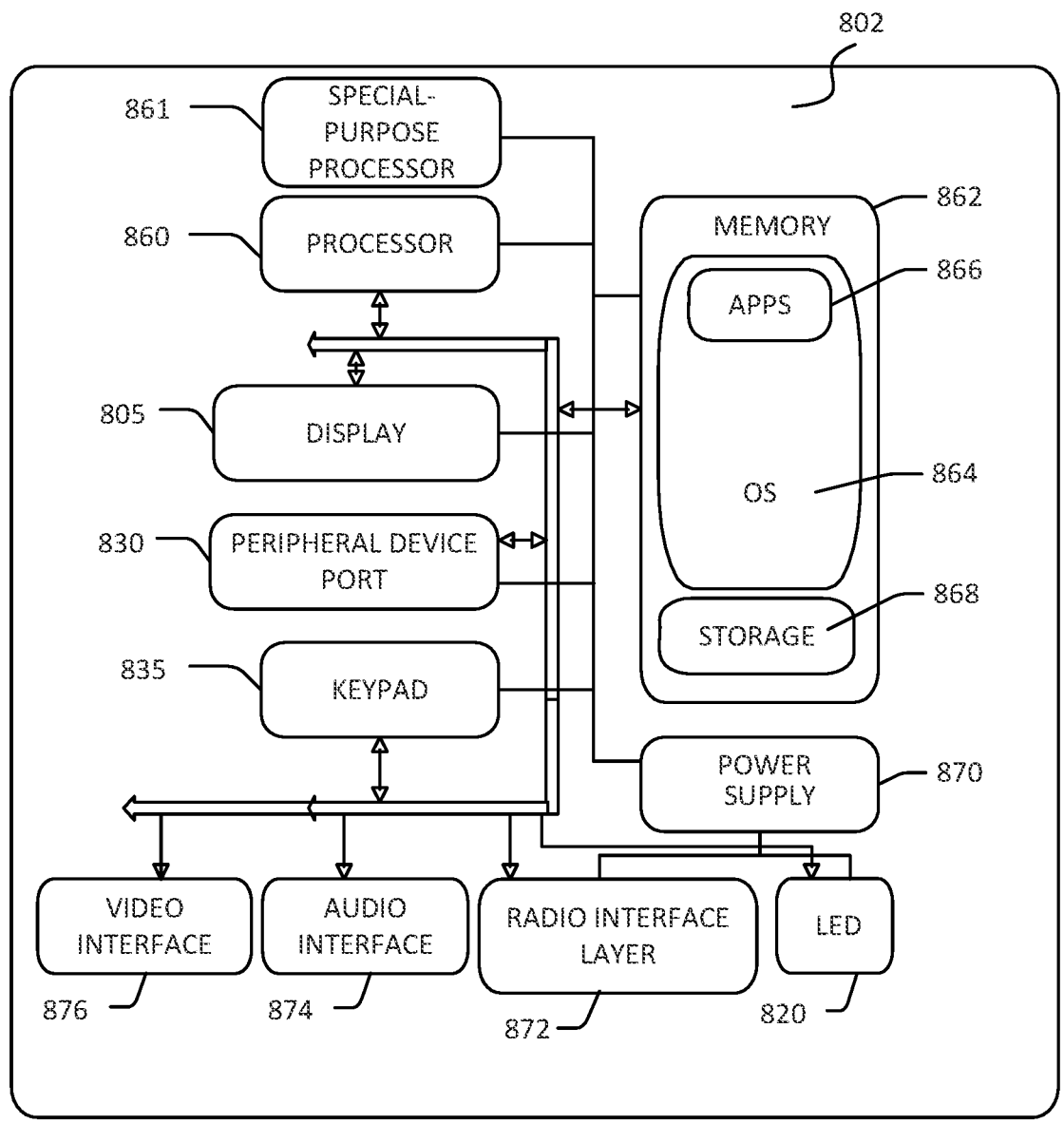
FIG. 8 is a simplified block diagram of a distributed computing system in which aspects of the present disclosure may be practiced.

FIG. 8 is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein (e.g., a sustainability manager, a software telemetry engine, etc.).

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8 by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

As will be understood from the foregoing disclosure, one aspect of the technology relates to a method comprising: searching for a video corpus including at least one product information, extracting at least one uniform resource locators (URL) from the video corpus, normalizing the at least one URL extracted from the video corpus, and displaying the at least one URL as a shoppable URL. In an example, the method further comprises a step of locating the shoppable URL comprising a URL conflation. In another example, the method further comprises wherein the URL conflation involves an initial process of obtaining a short URL. In a further example, the short URL obtained is expanded using strong URL normalization. In yet another example, the strong URL normalization uses a crawler to expand short URL to a full URL. In a further still example, displaying the shoppable URL further comprising a product link, a product description, and a product image. In another example, the method further comprising detecting and removing of a duplicate product information. In a further example, the method further comprising a noise reduction. In yet another example, the noise reduction involves text classification to exclude unrelated product information.

In another aspect, the technology relates to a system. The system comprising: at least one processor, and memory storing instructions that, when executed by the at least one processor, causes the system to perform a set of operations, the set of operations comprising: searching, by the at least one processor, a video corpus including at least one product information, extracting, by the at least one processor, at least one universal resource locators (URL) of the at least one product information, normalizing, by the at least one processor, the at least one URL extracted, and displaying the at least one URL as a shoppable URL. In another example, normalizing the at least one URL comprising a URL conflation. In yet another example, the URL conflation involves obtaining, by the at least one processor, a short URL. In a further still example, the short URL is expanded into a full URL using strong URL normalization. In another example, a crawler is used to expand the short URL into the full URL. In yet another example, displaying the shoppable URL further comprising a product link, a product description, and a product image. In a further still example, extracting the at least one URL includes extracting of at least one full URL and/or at least one short URL. In another example, extracted the at least one full URL and the at least one short URL are combined to generate a combined URL. In yet another example, the combined URL is normalized using a strong normalization. In a further still example, a noise is removed from the normalized URL. In another example, the normalized URL is stored in a datastore.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computer-implemented method, performed by at least one processor, of providing media comprising:
   identifying, by the at least one processor, a product using a machine learning model that receives content from a video corpus, the machine learning model trained to analyze video frames and detect product-related features from a video corpus associated with a product;
   extracting, by the at least one processor and from the video corpus, a uniform resource locator (URL) associated with the product;
   determining, by the at least one processor, that the product matches an item description in a catalog by parsing the extracted URL;
   determining, by the at least one processor and from the extracted URL, a selectable URL associated with the product matching the item description in the catalog;
   normalizing, by the at least one processor, the selectable URL by performing a digital alteration that reduces noise in the selectable URL to produce a normalized selectable URL;
   determining, by the at least one processor, that the normalized selectable URL corresponds to the product by applying a product category filter to the normalized selectable URL; and
   causing, by the at least one processor, display of the normalized selectable URL, such that selection of the normalized selectable URL results in display of corresponding product information.

2. The method of claim 1, wherein determining the selectable URL comprises performing URL conflation to parse the extracted URL and retrieve the product information.

3. The method of claim 2, wherein the URL conflation comprises obtaining a short URL containing the product information.

4. The method of claim 3, wherein the short URL is expanded into a full URL using strong URL normalization, and wherein the strong URL normalization uses a crawler to expand the short URL into the full URL.

5. The method of claim 1, wherein causing display of the normalized selectable URL comprises displaying a product link, a product description, or a product image.

6. The method of claim 1, further comprising detecting and removing, by the at least one processor, duplicate product information, wherein the duplicate product information comprises a product link, a product description, or a product image.

7. The method of claim 6, wherein detecting and removing duplicate product information comprises applying a video duplication filter to;
   identify one or more normalized URLs for a same product and prevent redundant display.

8. The method of claim 1, wherein the digital alteration that reduces noise comprises applying text classification to exclude unrelated product information from the normalized selectable URL.

9. The method of claim 1, wherein the machine learning model is trained on labeled video data to detect product identifiers, product packaging, or product-related metadata in video frames, and wherein the digital alteration comprises removing URL parameters unrelated to product identification, including session tokens, tracking codes, and advertising tags.

10. The method of claim 1, wherein parsing the extracted URL to determine that the product matches the item description in the catalog comprises:
    extracting product data from the extracted URL; and
    searching a catalog store using the extracted product data to identify a matching item description.

11. A system for providing media comprising:
    at least one processor; and
    memory storing computer-readable instructions that, when executed by the at least one processor, cause the system to perform operations comprising:
    identifying, by the at least one processor, a product using a machine learning model which receives content from a video corpus associated with the product, the machine learning model trained to analyze video frames and detect product-related features from the video corpus;
    extracting, by the at least one processor and from the video corpus, a universal resource locator (URL) associated with the product;

determining, by the at least one processor, that the product matches an item description in a catalog by parsing the extracted URL;

determining, by the at least one processor and from the extracted URL, a selectable URL associated with the product matching the item description in the catalog;

normalizing, by the at least one processor, the selectable URL by performing a digital alteration that reduces noise in the selectable URL to produce a normalized selectable URL; and causing, by the at least one processor, display of the normalized selectable URL, such that selection of the normalized selectable URL results in display of corresponding product information.

12. The system of claim 11, wherein normalizing the selectable URL comprises performing URL conflation to parse the selectable URL and retrieve the product information.

13. The system of claim 12, wherein the URL conflation comprises obtaining, by the at least one processor, a short URL containing the product information, wherein the short URL is expanded into a full URL using strong URL normalization, and wherein the strong URL normalization uses a crawler.

14. The system of claim 11, wherein causing display of the normalized selectable URL comprises displaying a product link, a product description, or a product image.

15. The system of claim 11, wherein extracting the URL comprises extracting at least one full URL or at least one short URL associated with the product.

16. The system of claim 10, wherein extracting the URL comprises extracting at least one full URL and at least one short URL associated with the product, and wherein the extracted at least one-full URL and the at least one short URL are combined to generate a combined URL used to retrieve the corresponding product information.

17. The system of claim 16, wherein the combined URL is normalized using strong normalization.

18. The system of claim 17:
wherein noise is removed from the normalized combined URL,
wherein the noise comprises information that does not match the item description in the product catalog, and
wherein the normalized combined URL is stored in a datastore in a retrievable form such that when a user selects a same product, the normalized combined URL stored in the datastore is provided.

19. The system of claim 11, wherein the operations further comprise determining, by the at least one processor, that the normalized selectable URL corresponds to the product by applying a product category filter to the normalized selectable URL.

20. Non-transitory computer storage media comprising computer-readable instructions that, when executed by at least one processor, cause operations to be performed comprising:

identifying a product using a machine learning model which receives content from a video corpus associated with the product, the machine learning model trained to analyze video frames and detect product-related features from the extracting, from the video corpus, a universal resource locator (URL) associated with the product;

determining that the product matches an item description in a catalog by parsing the extracted URL;

determining, from the extracted URL, a selectable URL associated with the product matching the item description in the catalog;

normalizing, the selectable URL by performing a digital alteration that reduces noise in the selectable URL to produce a normalized selectable URL;

determining that the normalized selectable URL corresponds to the product by applying a product category filter to the normalized selectable URL; and causing display of the normalized selectable URL, such that selection of the normalized selectable URL results in display of corresponding product information.

* * * * *